United States Patent [19]
Haas et al.

[11] Patent Number: 5,273,167
[45] Date of Patent: * Dec. 28, 1993

[54] APPARATUS FOR STACKING INDIVIDUAL ONE PIECE RECEPTACLES

[75] Inventors: Franz Haas; Frank Buschbeck; Theodor Schmeskal, all of Österreich, Austria

[73] Assignee: Franz Haas Waffelmaschinen Industriegesellschaft m.b.H., Vienna, Austria

[*] Notice: The portion of the term of this patent subsequent to Nov. 17, 2009 has been disclaimed.

[21] Appl. No.: 687,724

[22] Filed: Apr. 19, 1991

Related U.S. Application Data

[62] Division of Ser. No. 492,979, Mar. 12, 1990, Pat. No. 5,032,414.

[30] Foreign Application Priority Data

Mar. 13, 1989 [AT] Austria .................................. 577/89

[51] Int. Cl.⁵ ................................................ B07C 5/00
[52] U.S. Cl. ..................................... 209/591; 209/601; 209/912; 414/788.2; 414/789.9; 414/795.3; 414/790.3; 425/169; 425/400
[58] Field of Search ............... 414/788.2, 788.7, 789.9, 414/790.3, 795.3, 222; 99/353, 355, 357, 427, 439, 443 C, 386; 73/41, 37.5, 45, 49.2; 209/912, 601, 591, 552, 556, 558; 409/143, 139, 185, 137, 133, 69; 425/135, 169, 383, 400, 403.1, 404

[56] References Cited

U.S. PATENT DOCUMENTS

| | | | |
|---|---|---|---|
| 3,374,887 | 3/1968 | Paruolo et al. | 209/591 X |
| 3,461,716 | 8/1969 | Thomson | 209/591 X |
| 3,462,996 | 8/1969 | Frank | 209/591 X |
| 3,499,063 | 3/1970 | Ninneman et al. | 414/795.3 X |
| 3,805,593 | 4/1974 | Sandoz et al. | 73/41 X |
| 3,921,808 | 11/1975 | Sakai | 209/591 |
| 4,038,016 | 7/1977 | Griner et al. | 425/348 S X |
| 4,417,508 | 11/1985 | Haas, Sr. et al. | 99/355 |
| 4,802,808 | 2/1989 | Wolk et al. | 414/790.3 X |
| 4,852,745 | 8/1989 | Lemaire et al. | 209/912 X |
| 4,899,573 | 2/1990 | Dimmick et al. | 73/49.2 R |
| 5,032,413 | 7/1991 | Haas et al. | 426/231 |
| 5,163,313 | 11/1992 | Haas et al. | 426/231 X |

FOREIGN PATENT DOCUMENTS

| | | | |
|---|---|---|---|
| 205360 | 12/1983 | German Democratic Rep. | 409/143 |
| 0002882 | 1/1979 | Japan | 414/788.2 |
| 1114603 | 9/1984 | U.S.S.R. | 414/788.2 |

Primary Examiner—D. Glenn Dayoan
Attorney, Agent, or Firm—Kurt Kelman

[57] ABSTRACT

Apparatus for the quality control of individual, one-piece receptacles, which are open at one end. The individual, one-piece receptacles are preferably aligned, in several groups, side by side, similarly with respect to their spatial orientation. The receptacles are turned over to a conveyor line where they pass through at least one testing station at which measurement results specific to each type of receptacle are obtained. The analysis of these results indicates the structural integrity and accuracy of shape of the respective receptacle. The receptacles, as a function of the receptacle-specific measurement results, are removed from the conveyor line if defective; and only the structurally integral and shape-accurate acceptable receptacles are stacked and further advanced as a stack.

27 Claims, 3 Drawing Sheets

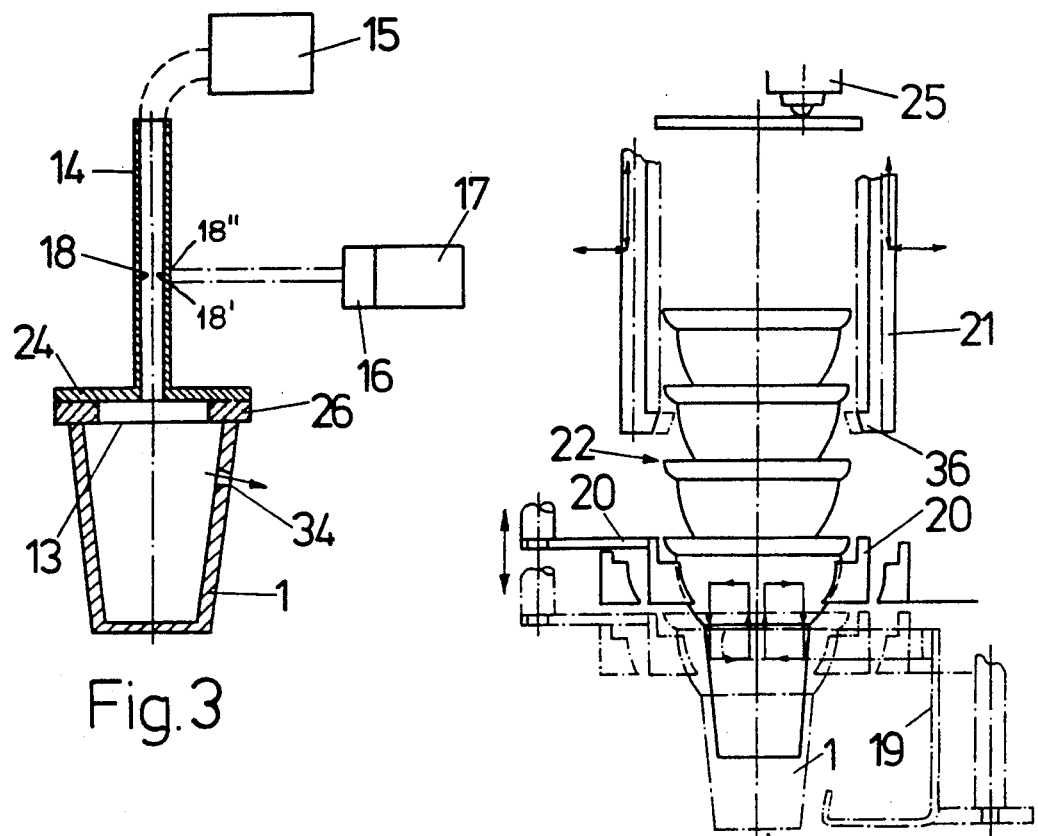
Fig. 3
Fig. 4
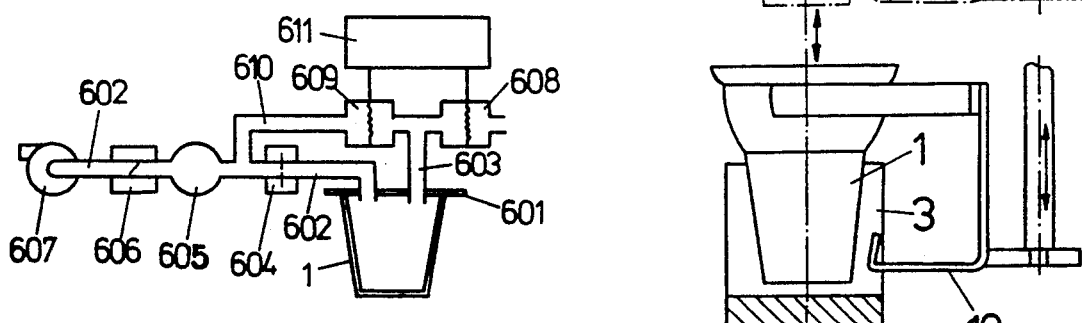
Fig. 6

APPARATUS FOR STACKING INDIVIDUAL ONE PIECE RECEPTACLES

CROSS-REFERENCE TO RELATED APPLICATION

This is a division of copending application Ser. No. 492,979, filed Mar. 12, 1990, now U.S. Pat. No. 5,032,414.

BACKGROUND OF THE INVENTION

1. Field of the Invention

The present invention relates to the quality control of receptacles which are open at one end, identical to each other and individually manufactured in large quantities, such as cones, cornets, cups, shells, in advance or additional treating or further processing. Generally, following their manufacture, such receptacles are fitted, slid or in some other way nested one into the other and subsequently packaged in stacks or further advanced in stacks to be coated or filled.

2. The Prior Art

One type of receptacles in question are those wafer-like cornets and cones known to the foodstuffs and luxury foods industries which are made from a waffle-type batter baked in wafer ovens for the consumption of ice cream and which, depending on their size, are baked, 4 to 11 in count, in one of the wafer baking molds of a wafer oven. If a wafer baking oven is utilized, there are 72 identically constructed baking tongs inside the oven. Each tong has a multipart baking mold accommodating 11 cornets. The baking tongs are arranged in an interconnected fashion to form a continuous chain of baking tongs, and revolve from the batter or dough filling station through the baking area to the wafer output station.

Approximately 24,000 cornets will leave the wafer output station on an 11-track chute in successive transverse tiers containing 11 cornets per transverse tier. The wafer cornets are generally conveyed in successive transverse tiers to a stacking device enabling them, in stacked form, to be more easily and quickly transported and packaged or otherwise treated. Generally, the cornets are nested one in another to form stacks of a predetermined height and length, packed in cartons by the wafer manufacturer and forwarded to a plant for further processing where the cornets are inserted, in stacks for example, into a soft-ice cream dispensing machine.

In the manufacturing of wafer cornets, wafer cones and similar hollow wafers in wafer baking ovens, methods utilizing excess batter of dough to ensure reliable filling of the baking molds were used and longer baking times, with reference to the banking temperature, were run. The amount of batter and the baking temperature and baking time were selected in such a way that the number of defective baked wafers was very low. Consequently, a thorough quality control inspection of the wafers was not required, or the high costs attendant on such inspection, in view of the low number of defective wafers produced, was uneconomical.

As a result of efforts aimed at increasing the yield of baked wafers per kilogram of batter or dough used and at optimizing baking conditions, directed toward making baking times as short as possible, the risk that the number of incomplete or qualitatively less than perfect hollow wafers among the perfectly formed and baked hollow wafers has markedly increased.

SUMMARY OF THE INVENTION

It is an object of the present invention to recognize defective receptacles as soon as possible in order to enable them to be eliminated, in a timely fashion, from further treatment or further processing.

As examples of receptacles to which the present invention may relate could be mentioned, among others, cups, cones, cornets, plates, rectangular, trough-shaped or box-like receptacles, trays; further, receptacles of porous or fine-pored materials, coated receptacles of fine-pored material, receptacles of baked baking dough or baked wafer batter, with or without surface coating; further, thin-walled hollow wafer bodies, such as wafer cones, wafer cornets, wafer cups, wafer plates or other thin-walled hollow bodies of wafer material, with or without surface coating.

The above object is accomplished in accordance with the present invention by providing an apparatus for the stacking of individual, one-piece receptacles, which are open at one end to provide a charging aperture and which are stackable by being nested inside each other, which comprises an elongated conveyor mechanism extending in a conveying direction and having receiving elements for the receptacles arranged in one or more tracks extending in the conveying direction, and disposed sequentially along the conveyor mechanism and sequentially passing by the receptacles as the receiving elements are conveying in said direction by the conveyor mechanism. The apparatus has an intake station comprising means for depositing the receptacles in the receiving elements of the conveyor mechanism, preferably an aligning station comprising means for imparting the same spatial orientation to the receptacles deposited in the receiving elements, a first testing station comprising means for testing the oriented receptacles in the receiving elements for a nominal contour and for removing portions of the receptacles projecting beyond the contour, a second testing station comprising means for testing the oriented and contour-tested receptacles in the receiving elements for structural integrity, and a stacking station comprising means controlled from the second testing station for removing the oriented and contour-and structural integrity-tested receptacles from the receiving elements and for stacking the removed receptacles.

Another embodiment of the invention provides that the receptacles are subjected to a structural integrity inspection at a testing station. For receptacles made of porous material, it is additionally proposed, simultaneously with the testing for the structural integrity of the receptacle, that the permeability and structural quality of the receptacle material also be determined on the receptacle at the testing station.

Another embodiment of the invention provides for having the receptacles initially pass through a first testing station at which they are tested for accuracy of shape, and then pass through a second testing station only thereafter at which they are tested for structural integrity. In accordance with a further embodiment of the invention, any protruding crusts or bumps which project above the finished nominal contour of the receptacles within predetermined tolerances can be removed during testing for the accuracy of contour. The nominal size or shape is defined as that acceptable size or shape which is used as a reference against which the receptacle as produced is compared.

By virtue of this, not only can the appearance and subsequent treatment of the receptacles be improved by removing spurs, injection incrustations or the like, but the test for structural integrity can also be facilitated as well by improving the accuracy of shape of the charging aperture of the receptacles.

In a further embodiment, provision can be made so that regions of the receptacle wall exhibiting differences in shape deviating from the nominal finished shape of the receptacle and exceeding default tolerances are destroyed. This occurs during the test for accuracy of shape, such that the receptacles in question are recognized as defective during the subsequent test for structural integrity.

In testing the structural integrity, a vacuum may be applied to the charging aperture of the receptacle. The measured current of air through the walls of the receptacle is used as the feedback value for the structural integrity of the receptacle or the receptacle material.

In testing the structural integrity of the receptacle, compressed air may be introduced into the receptacle through the receptacle's charging aperture. The measured loss of air through the walls of the receptacle is used as the feedback value for the structural integrity of the receptacle or the receptacle material.

In analyzing test results, the invention can provide that the feedback value ascertained in order to test structural integrity be compared with a predetermined nominal value. With receptacles made of porous material, at least one structurally integral and shape-accurate reference receptacle can be tested at the testing station to test the structural integrity of the receptacles to determine nominal value.

In order to stack receptacles baked individually or in several groups in a baking oven having revolving two- or multipart baking molds, which can be opened and closed, and are preferably accommodated in an endless chain, the invention contemplates that the baking molds constitute a feeder device for receptacles made of baked dough or batter, for example, for cones exhibiting tapered sections, and which molds revolve through the baking oven.

The present invention additionally provides that, at the intake station, below the track conveying the two- or multipart baking molds, a holding device be provided. This device accompanies the baking molds over a certain length of the distance of conveyance, in particular, from the time prior to the opening of the baking molds to the moment of release of all the receptacles delivered up by the baking molds. This holding device can be moved back and forth between the track conveying the baking molds and the conveyor mechanism. This holding device picks up the receptacles and turns them over to the conveyor mechanism and into which holding device the receptacles, after the baking molds have opened, are deposited or, more particularly, ejected. The disposition of a holding device between the feeder device or between the baking molds and the conveyor mechanism is desirable in that the baked receptacles do not fall out at once when the molds are opened. The holding device which extends parallel to the individual baking molds remains under the respective baking mold until such time as all receptacles have fallen out of the baking mold. Then it advances all these receptacles at the same time or at a specific time interval toward the conveyor mechanism or deposits them into the receiving elements of the conveyor mechanism.

According to the invention, the aligning station can additionally be provided with holding device which interacts with the receiving elements of the conveyor mechanism. The holding device may desirably include a pressure plate which can be raised and lowered relative to the conveyor mechanism and which serves to press the receptacles against the receiving elements which are preferably shaped like fingers.

Another feature of the invention provides a stationary punching template, corresponding to the exterior nominal contour of the receptacles, for each track conveying the receptacles advanced by the conveyor mechanism. The punching template is arranged in the track conveying the receptacles and functions to cut off burrs projecting on the outside of the receptacles beyond the exterior nominal contour.

Moreover, in accordance with the invention, a calibration mandrel which corresponds to the interior nominal contour of the receptacles and which can be inserted into the receptacles can be provided.

Another feature of the invention comprises at the stacking station a transfer gripper to lift the receptacles from the receiving elements of the conveyance mechanism. The transfer gripper is provided for each track of conveyance, whereby all the transfer grippers are controlled by the station testing for the structural integrity of the receptacles or by the analysis unit connected to this station. In this way, a straightforwardly put together stacking device is constructed which can readily be controlled from the testing station inasmuch as only the operation of the transfer gripper has to be controlled. If the testing station reports that a defective receptacle is being advanced by the conveyor mechanism, then the transfer gripper remains in its raised position. In every other case the transfer gripper will be lowered and the receptacle removed from the receiving elements of the conveyor mechanism and fed to the stack.

Each transfer gripper is arranged in a rest position above the respective track of conveyance and executes a downward stroke into the track conveying the receptacles to grasp a receptacle.

According to the invention, moreover, a stacking gripper can be arranged above each transfer gripper and the respective receptacle can be lifted into the gripping zone of the stacking gripper by means of the transfer gripper, from which zone the receptacle can be fed to a stack formed in a holding device.

The embodiment of the invention provides that the fixing or holding device has a level monitor, for example, a cut-off switch. When the appropriate level has been reached by this switch, it can be swung in the direction of a preferably essentially horizontal removal track. Onto this removal track the stack of receptacles can be deposited or removed from the now open holding device. The holding device is arranged essentially vertically with respect to the conveyor mechanism. In order to form a stack of the receptacles, the holding device swings out into an essentially horizontal position resting against the removal track. This enables the stack of receptacles to be removed in a straightforward manner. The stack formed can be removed by hand or automatically fed to a packaging device.

The apparatus may comprise a measuring head which can be seal-mounted to the charging aperture of a receptacle; a line for connecting the interior of the receptacle to a compressed air source or vacuum source; a restrictor located in this line; pressure measuring sensors arranged on both sides of the restrictor to determine measurement values of the pressure differential at both sides of the restrictor; and an analysis unit to which is fed the pressure differential and the air flow through the restrictor is determined and used as a measure of the permeability of the receptacles or receptacle walls.

Analysis utilizing this process is performed very quickly, such that even the next timed step can be controlled as a function of the respective testing result.

Within the context of the present invention, the following are interpreted as constituting defective receptacles:

A: Receptacles in which
a) the dimensional shape of the receptacle or its exterior and/or interior surface deviates from a default nominal shape in excess of predetermined tolerances or in which
b) manufacturing-incurred burrs, lugs, ribs or the like project from the receptacle beyond predetermined tolerances established for the nominal shape, or in which
c) one or more flaws exist in the wall of the receptacle, for example a hole in the receptacle wall or an incompletely formed edge on the charging aperture of the receptacle, or B: Receptacles made of porous or fine-pored materials, in which
a) any of the defects cited in A, above, are manifest, or in which
b) localized flows in the receptacle wall are formed by a single, large bubble or by an accumulation of a greater than average incidence of large pores which greatly increase permeability of the receptacle wall and locally reduce the strength of the receptacle wall without their being a hole in the receptacle wall itself, or in which
c) an accumulation of oversized pores extends over a larger surface area of the receptacle wall, such that an essentially uniform, complete receptacle wall area is so porous as if a single large hole in actuality existed there, or C: Receptacles made of porous or fine-poured material and having a coating on the interior and/or exterior surface of the receptacle, in which
a) any of the defects cited in A, above, are manifest, or in which
b) the coating displays one or more flaws, such that the imperviousness of the receptacle to be achieved by virtue of the coating, is not realized.

In accordance with the invention, the receptacles are tested with respect to their structural integrity and accuracy of shape in order to determine whether they are free of the above-named defects.

In order to determine the structural integrity of a receptacle, the receptacle's permeability to air or gas is ascertained, whereby a distinction, with regard to both the feedback values as well as the nominal values to be established, must be made between 1) receptacles made of impermeable material; 2) receptacles made of porous, coarse- or fine-pored material, and 3) receptacles made of porous, coarse- or fine-pored material with a coating which reduces the permeability of the receptacle wall to air and gas, respectively, to a desired value.

With receptacles made of porous, air- and gas-permeable material, the structurally integral receptacle possesses an accurately estimable air permeability value, without flawed locations and holes, and with a regular structural constitution. This value can be clearly distinguished from the air permeability value of a similar receptacle having a small hole or an inadequate structural constitution as a result of too many oversized pores.

With coated receptacles made of porous, air- and gas-permeable material, the structurally integral receptacle possesses an accurately estimable air permeability value commensurate with the measure of air permeability to be achieved on the basis of the coating, which value can be clearly distinguished from the air permeability value of an inadequately coated receptacle or one which has not been coated at all.

BRIEF DESCRIPTION OF THE DRAWINGS

Other objects and features of the present invention will become apparent from the following detailed description considered in connection with the accompanying drawing which discloses several embodiments of the present invention. It should be understood, however that the drawing is designed for the purpose of illustration only and not as a definition of the limits of the invention.

In the drawing wherein similar reference characters denote similar elements throughout the several views:

FIG. 3 shows schematically the testing device used in the testing station of the apparatus pursuant to FIG. 1 to test the structural integrity of a receptacle;

FIG. 4 shows schematically the gripper and stacking station of FIG. 1;

FIG. 6 schematically represents another practical embodiment of the testing device.

DETAILED DESCRIPTION OF PREFERRED EMBODIMENTS

Figure 1:
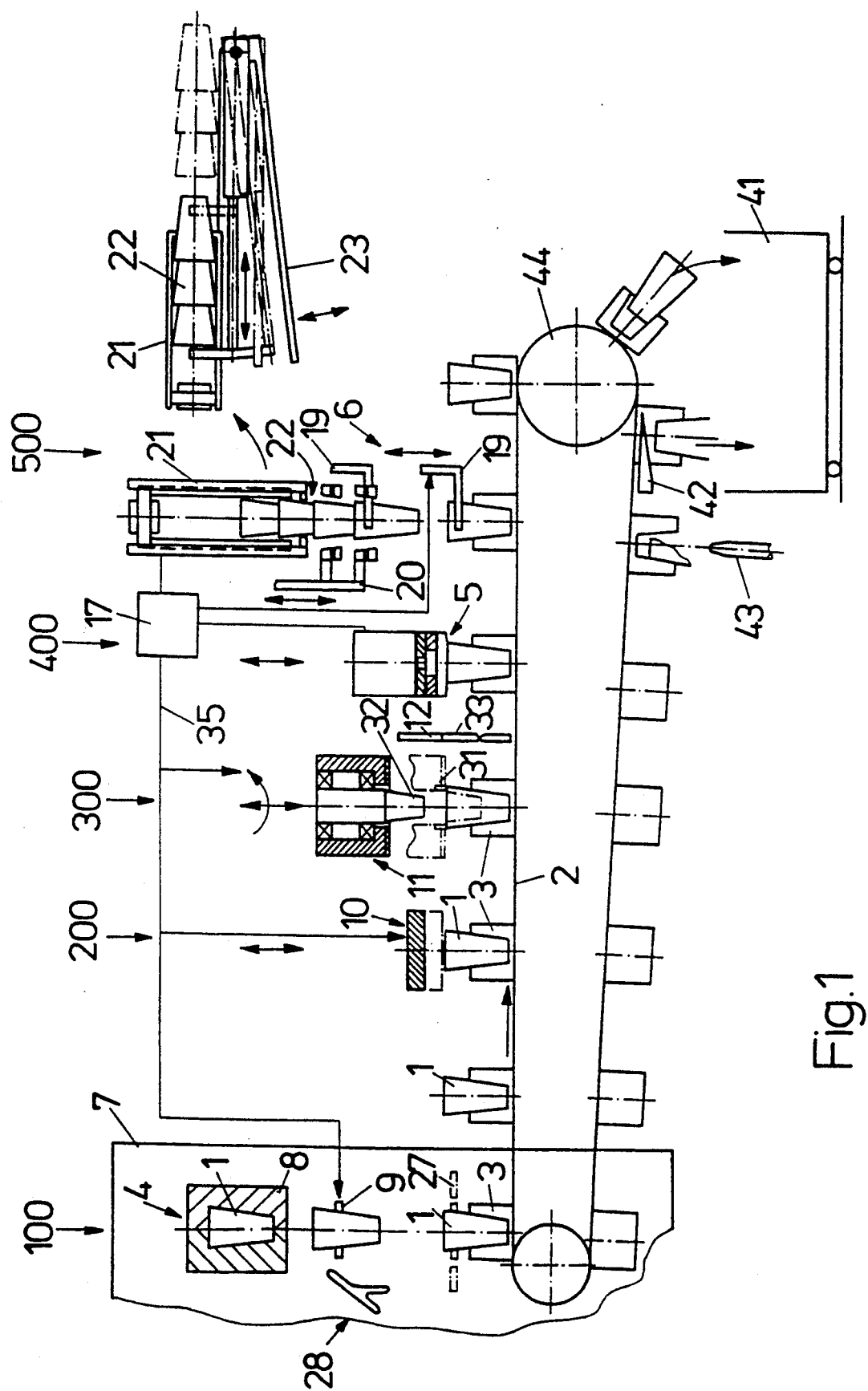
FIG. 1 schematically shows a preferred embodiment of apparatus to implement a preferred embodiment of the invention.

Turning now in detail to the drawings, FIG. 1 shows a practical embodiment of a device or apparatus according to the invention, comprising an extended conveyor mechanism 2 configured as a chain conveyor along which, in the direction of conveyance and following one after the other, are arranged an intake station 100, an aligning station 200, a first testing station 300, a second testing station 400, and a stacking station 500.

The intake station 100 of the device or apparatus according to the invention is arranged at the output station of a baking oven 7 exhibiting a revolving baking mold chain 4. Here the multi-part baking molds 8 of the baking mold chain 4, which can be opened and closed, exhibit, respectively, four mold cavities for one cup 1 each. These cavities are arranged one behind the other in the moving direction of the baking mold chain 4. The baking mold chain, here represented symbolically only, forms the feeder device 4 of the apparatus according to the invention which charges the intake station 100 with receptacles 1, e.g., wafer cones. At the output station of the baking oven 7 and, consequently, at the intake station 100 of the apparatus according to the invention, the baking molds 8 are opened, and the receptacles 1 are released into a holding device 9 of the intake station 100. Because release of receptacles 1 out of the baking molds 8 does not occur at exactly identical times, the holding device 9 is entrained along with and below the baking molds 8 until such time as the receptacles 1 have been released. The holding device 9 is then lowered and the receptacles 1 held by this holding device are brought in contact with the receiving elements 3 of the conveyor mechanism 2 or set in them.

The baking molds 8 advance the baked receptacles 1 through the baking oven 7, at an essentially constant speed, diagonally to the direction of movement of the conveyor mechanism 2 shown. The holding device 9 comprises transfer grippers 27 which can be opened. By means of device 9 the unevenly protracted adherence of the receptacles 1 to the baking molds 8, as well as the relatively long distance covered by the receptacles 1 from the baking molds 8 to the conveyor mechanism 2, can consequently be avoided. The result is that the receptacles 1 are released onto the conveyor mechanism 2 at specific time intervals. Consequently, synchronous, distance-restricted entrainment of the holding device 9, along with the baking molds 8 or the baking mold chain 4 of the baking oven 7, results. The movement of the holding device 9 is illustrated by the curve 28. A more detailed explanation of how the holding device 9 operates is shown in FIG. 2.

Figure 2:
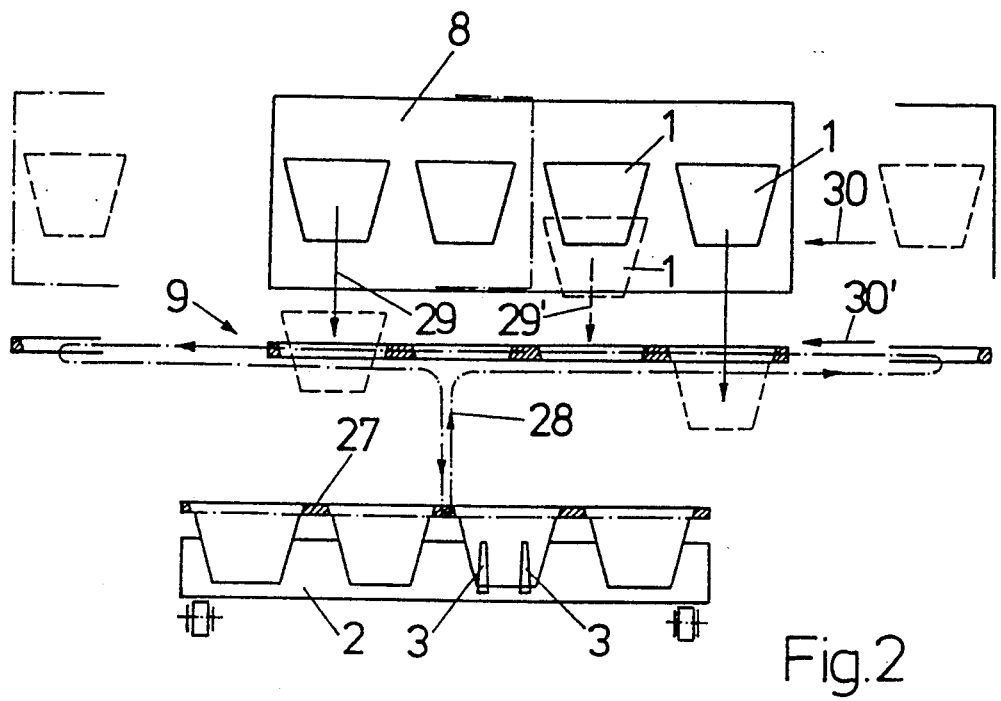
FIG. 2 shows schematically the intake station of the apparatus of FIG. 1, with a holding device for the receptacles.

FIG. 2 shows a baking mold 8 which is moving in the direction of the arrow 30, that is, in the moving direction of the baking mold chain, which baking mold entrains the receptacles 1. Arrow 29 represents the track of conveyance of an initial receptacle 1 which has already fallen out of the baking mold 8. Arrow 29' indicates the course of a receptacle 1 which has not yet fallen out of the baking mold 8 and which, with respect to the first receptacle, would fall onto the conveyor mechanism 2 later. Curve 28 illustrates the path of the holding device 9 which, as indicated by arrow 30', proceeds, in part, synchronous with or parallel to the track of the baking mold 8, so far until all four receptacles 1 have fallen out of the baking mold 8. The lowering of the holding device 9 to the finger-shaped receiving elements 3 of the conveyor mechanism 2 occurs essentially exactly above the conveyor mechanism 2. The conveyor mechanism 2 can suitably be a conveyor belt, a chain conveyor or other conveyor devices which are preferably advanced at specific time intervals. On the conveyor device, the receiving elements 3 are equivalent in numbers to the number of receptacles 1 emerging side by side from the baking molds 8. These receiving elements 3 are arranged side by side on tracks extending diagonally with respect to the direction of conveyance. In the practical embodiment shown, these consist of four tracks extending parallel to each other and which correspond to the four receptacles 1 simultaneously baked in a baking mold 8.

The holding device 9 is driven by corresponding cam plates and control drives. The track of the holding device does not necessarily have to be T-shaped; it could, for example, also be L-shaped. That is, the synchronous movement with the baking mold 8 or the baking mold chain 4 of the baking oven 7 could occur at an earlier point in time. As concerns the drive, a T-shaped track has proven to be preferable.

After the receptacles 1 in the intake station 100 have been placed by the holding device 9 into the receiving elements 3 of the conveyor mechanism 2, they are advanced to an aligning station 200. Here they are aligned by a positioning device 10 which is configured as a pressure plate and which interacts with the receiving elements 3 of the conveyor mechanism 2. Thus the receptacles are pressed into the receiving elements 3 at a predetermined pressure. In this way, the same spatial orientation is imparted to all the receptacles 1, with the result that they are correctly positioned on the conveyor mechanism for the following test.

Following the alignment station 200, the receptacles are advanced in a precisely defined position to the testing station 300 to determine the accuracy of shape where, above each track of receiving elements 3, a non-rotating calibration mandrel 32 is provided. The calibration mandrel 32 is aligned exactly with respect to the position of the respective receptacle 1 and corresponds to the nominal interior contour of the receptacles 1. The mandrel 32 is surrounded by a surface processing device 11 equipped with rotating milling rings 31. By means of these rotating milling rings 31, burrs projecting above the surface plane of the charging aperture 13 of the receptacle 1 are removed without machining the areas lying in this surface plane of the charging aperture.

The calibration mandrel 32 can also be replaced by a milling tool in order to process the interior of the receptacle 1. If the calibration mandrel 32, which is arranged concentrically to the receptacle 1, were axially inserted into the receptacle 1, any existing interior salient bulges would be destroyed or worn down, resulting in a defective receptacle to be discarded, since its permeability to air would thereby be increased.

At the testing station 300 to determine the accuracy of shape, a punching template 12, with an opening 33 for the receptacle 1, is arranged downstream from the surface processing device 11. It is through opening 33 that the receptacles 1 are conveyed and during which passage any burrs, lugs or the like projecting from the receptacles 1 are sheared off. The alignment of the receptacles 1 occurs preferably on the conveyor mechanism 2 in such a way that the punching template 12 extends parallel to the baking fins of the receptacle 1. The punching template can also be placed in front of the surface processing device 11.

Following the testing station 300 to determine the accuracy of shape is located another testing station 400. At station 400, if necessary, any receptacles 1 not deliberately destroyed by the surface processing device 11, or the calibration mandrel 32, are tested with respect to their structural integrity. This process is described in FIG. 3 in more detail. A measuring head 24, connected via a line 14 to a compressed air, or vacuum, source 15 is mounted through the intermediary of a seal 26, on the receptacles 1. Seal 26 may be, for example, a rubber gasket, a bellows joint or the like. Receptacles 1 have been advanced, or halted, at the station 400 at the corresponding tempo by the conveyor mechanism 2. A restrictor 18 is arranged in the line 14 on both sides of which gauge measurement sensors 18', 18" are arrayed which measure the pressure on both sides of the restrictor 18, routing corresponding measurement signals to the analysis unit 16.

It is also possible to provide for the measurement sensors in the analysis unit 16 by only extending pressure lines to both sides of the restrictor. Based on the drop in pressure caused by the restrictor, or resulting from the pressure difference prevailing at both sides, the magnitude of the air flow through the restrictor 18 can be determined. If the receptacle 1, for example, is a wafer cone made of porous material, and has a defect 34, represented here as a hole in the receptacle wall, then, based on the air flow through the restrictor 18, a determination can be made. Thus it can be determined whether the flow of air to be assigned to this defective receptacle 1 exceeds a specific minimum value corresponding to the "ideal" or the flawless receptacle 1, which value is correlated to the permeability of the receptacle. Corresponding signals formed in the analysis unit 16 are compared, preferably in a comparator device, against default or rejection nominal values and sent as a control signal to a control device 17 to segregate out the defective receptacles. The test can be performed using both overpressure and negative pressure; and an analysis of results can be performed on a real-time basis.

Where several receptacles aligned diagonally to the direction of movement of the conveyor mechanism 2 are advanced at the same time, the measuring head 24 can be formed by a plate bearing an equivalent number of lines 14 with restrictors 18. By means of corresponding fine tuning, a corresponding constant input pressure can be achieved in the testing system and, consequently, the accuracy of the measurement increased accordingly.

The control device 17 is shown schematically by the arrows or the lines 35 in FIG. 1. Device 17 controls the holding device 9, the holding device 10, the surface processing device 11 of the testing station 300 used to determine the accuracy of shape, the testing device 400 used to test structural integrity as well as the yet-to-be-described stacking device at the stacking station 500.

It is to be understood that the individual stations have similar drive mechanisms which can be either electrically, electro-magnetically or pneumatically operated. Because these drive mechanisms are well known to those skilled in the art, it is not necessary that they be described in greater detail.

A gripper or stacking device 6 at station 500 is arranged following the testing station 400. Testing station 400 provides, with respect to each receptacle 1, the information as to whether that receptacle is to be accepted or rejected. Every receptacle in the row of receptacles is separately manipulated in the gripper or stacking device 6. Pieces deemed acceptable by the testing station 400 are grasped and raised into a hand-off position by means of a transfer gripper 19 which engages the receiving elements 3, on which the respective receptacle 1 stands upright, either from the front or from below. FIGS. 1 and 4 depict the method of engaging the receiving elements 3 from the front.

In its non-operating position, the transfer gripper 19 is in an elevated raised position above the track conveying the receptacles 1, such that a rejected piece is advanced undisturbed past and under the transfer gripper 19. When the transfer gripper 19 is lowered and its grasps a receptacle 1, the transfer gripper 19 raises the receptacle into a position in which the receptacle now finds itself at the bottommost location of a stack of receptacles 22. Thus it places the receptacle onto a stack of receptacles 22 already formed. In this position of contact with the stack of receptacles 22, the receptacle 1 fed to the stack is grasped by a stacking gripper 20 and raised up a predetermined distance which corresponds to the stacking division. Another receptacle 1 can thereupon be fed to the stack of receptacles 22 by the transfer gripper 19 from below, by signaling the transfer gripper 19, which is now free, to drop down and grasp another receptacle 1 which has passed inspection and is ready to be picked up. This sequence of movements results in the formation of a stack which continues to grow as long as pieces passing inspection continue to be delivered for stacking. Where the control system reports a reject, the transfer gripper 19 remains in the elevated, waiting or hands-off position.

Figure 5:
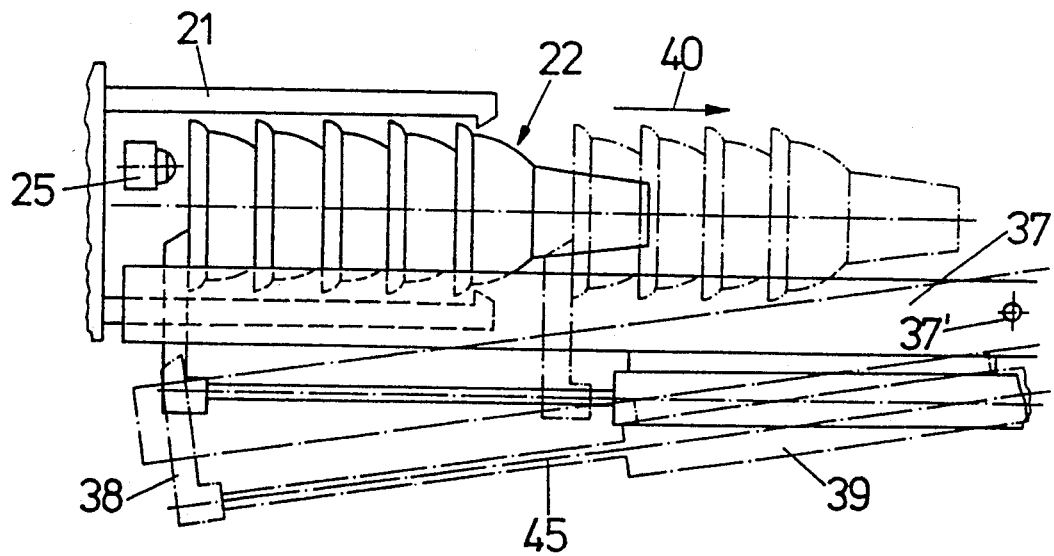
FIG. 5 shows the output station of the stacking device of FIG. 1.

The stack 22 is maintained in place by a holding device 21 which functions like a gripper, which holding device has grippings projections 36 to keep the receptacles 1 from falling back. When the stack reaches a height which is defined by an adjustable stop 25, or a cut-off, or proximity switch, then either the holding device 21 and the stack of receptacles 22 secured by the gripper projections 36 are conveyed, by swing devices not shown in greater detail, from an essentially vertical position, into an essentially horizontal position. Alternatively the stack 22 is moved closer to a removal track 37, as shown in FIG. 5, or the removal track 37 is swiveled about a point of rotation 37' in the direction of the stack of receptacles 22 and the holding device 21, with the result that the stack of receptacles 22 rests on or against the track 37. A driving cylinder 39 for a rod 45 is allocated to the track 37, which rod has a gripper pawl 38 which can be applied to the free end of the stack 22. When the rod 45 is displaced in the direction of the arrow, it removes the stack of receptacles 22 from the holding device 21, the arms of which have opened in order to move the gripper projections 36 out of the track of the stack of receptacles 22. The stacks of receptacles can thus be removed and, for example, packaged.

During the return movement of the conveyor mechanism 2 around an end roller 44, receptacles 1 not removed from the receiving elements 3 are ejected into a collection bin 41. Arrow shaped pins 42 or similar means engaging the receiving elements, are used to knock any receptacles out of elements 3 which may have become jammed in the elements 3 into the collection bin 41. By means of compressed air jets 43, brushes or the like, the receiving elements 3 can be cleaned of receptacle pieces adhering to them.

FIG. 6 schematically shows a second practical embodiment of a testing device to test the structural integrity of the receptacles 1. The measuring head 601, only schematically represented, which has been mounted onto the charging aperture of the receptacle 1 is connected to two lines 602, 603. Line 602 contains a calibration nipple 604 which restricts maximum flow speed and leads via an equalizing vessel 605 and a pressure-regulating valve 606, to a source of a vacuum or to an air pump 607. Line 602 leads to two differential pressure measurement probes 608 and 609, one of which measurement probes 608 is pressurized by ambient pressure, while the other measurement probe 609 is connected, via line 610, to line 602 on the side of the calibration nipple 604 facing away from the measuring head 601. Both differential pressure measurement probes 608, 609 are connected to an electronic analysis device 611 which performs a comparison of nominal values and issues an output signal to a control device not shown.

During the test, the volume sealed in the receptacle 1 by the measuring head 601 is charged to a negative pressure vis-a-vis ambient air pressure and maximum flow speed restricted by a pressure-regulating valve 604 (calibration nipple). In the process, depending on the sealing or the structural integrity of the receptacle or the quality of the structural texture of the material of the receptacle wall or the coating of the receptacle wall, a pressure difference, different from that of ambient pressure, or a different pressure difference above the calibration nipple comes into being. These pressure differences are measured and quantitatively analyzed for quality determination purposes.

In FIGS. 1, 3, 4, 5 and 6, only the devices or components assigned, respectively, to a single receptacle 1 or a single track of the receiving elements 3 of the conveyor mechanism 2 have been represented for the stations 200, 300, 400 and 500 of the device according to the invention. Obviously, these devices and components are provided, one beside the other, respectively, in numbers equivalent to the number of receptacles 1 supported by the receiving elements 3 in tracks extending side by side one another. At stations 200, 300 and 400, the devices or components assigned to a single receptacle track or to be arranged diagonally to the direction of conveyance of the conveyor mechanism 2, can be arranged in combined form in a common rack.

The invention has been explained on the basis of baked, uncoated, cup-shaped receptacles manufactured in a baking oven having revolving baking molds. Such receptacles can also be wafer cornets or wafer cones or even other receptacles made from batter or dough and manufactured and baked to their final shape in automatic wafer baking machines. The invention preferably finds application to receptacles made of porous, decayable material.

The present invention has the advantages that receptacles of widely varying materials can be subjected to a quality control testing procedure which includes all of the receptacles and not just a random sampling of the receptacles.

While only two embodiments of the present invention have been shown and described, it is to be understood that many changes and modifications may be made thereunto without departing from the spirit and scope of the invention as defined in the appended claims.

What is claimed is:

1. An apparatus for stacking individual, one-piece hollow receptacles open at one end and stackable by being nested inside each other, which comprises
   (a) an elongated conveyor mechanism extending in a conveying direction and having receiving elements for the receptacles arranged in one or more tracks extending in the conveying direction, and disposed sequentially along the conveyor mechanism and sequentially passing by the receptacles as the receiving elements are conveyed in said direction by the conveyor mechanism,
   (b) an intake station comprising means for depositing the receptacles in the receiving elements of the conveyor mechanism,
   (c) an aligning station comprising means for imparting the same spatial orientation to the receptacles deposited in the receiving elements,
   (d) a first testing station comprising means for testing the oriented receptacles in the receiving elements for a nominal contour and for removing portions of the receptacles projecting beyond said contour,
   (e) a second testing station comprising means for testing the oriented and contour-tested receptacles in the receiving elements for structural integrity, and
   (f) a stacking station comprising means controlled from said second testing station for removing the oriented and contour- and structural integrity-tested receptacles from the receiving elements and for stacking the removed receptacles.

2. The apparatus of claim 1, wherein the means for imparting the same spatial orientation to the receptacles comprises a positioning device interacting with the receiving elements and including a pressure plate vertically reciprocable relative to the conveyor mechanism to press the receptacles against the receiving elements for imparting the same spatial orientation to the receptacles.

3. The apparatus of claim 1, wherein the means for testing the oriented receptacles in the receiving elements for a nominal contour and for removing portions of the receptacles projecting beyond said nominal contour comprises for each track a calibration mandrel corresponding to an inner nominal contour of the receptacles and insertable in the receptacles, the mandrel removing portions of the receptacles projecting beyond said inner contour upon insertion in the receptacles.

4. The apparatus of claim 1, wherein the means for testing the oriented receptacles in the receiving elements for a nominal contour and for removing portions of the receptacles projecting beyond said nominal contour comprises for each track a stationary punching template corresponding to an exterior nominal contour of the receptacles, the conveyor mechanism being arranged to convey the receptacles in the receiving elements through the stationary template and the template cutting off portions of the receptacles projecting beyond said exterior contour as the receptacles pass through the template.

5. The apparatus of claim 1, wherein the means for testing the oriented receptacles in the receiving elements for a nominal contour and for removing portions of the receptacles projecting beyond said nominal contour comprises a surface processing device for removing said projecting portions.

6. The apparatus of claim 1, wherein the second testing station comprises for each track a measuring head arranged to be sealingly mounted on the open ends of the receptacles conveyed in said track, a source of compressed air, a line connecting the compressed air source to the measuring head and conducting a stream of compressed air from the compressed air source to the measuring head, a restrictor arranged in said line, two air pressure measuring sensors arranged to measure the air pressure prevailing in the line at a respective side of the restrictor, and an analysis unit connected to the measuring sensors, the analysis unit forming the difference between the air pressures at the respective sides of the restrictor and said difference constituting a measurement value for the structural integrity of the receptacles.

7. The apparatus of claim 1, wherein the second testing station comprises for each track a measuring head arranged to be sealingly mounted on the open ends of the receptacles conveyed in said track, a source of suction, a line connecting the suction source to the measuring head and conducting a stream of sucked air from the suction source to the measuring head, a restrictor arranged in said line, two air pressure measuring sensors arranged to measure the air pressure prevailing in the line at a respective side of the restrictor, and an analysis unit connected to the measuring sensors, the analysis unit forming the difference between the air pressures at the respective sides of the restrictor and said difference constituting a measurement value for the structural integrity of the receptacles.

8. The apparatus of claim 1, wherein the means controlled from said second testing station for removing the oriented and contour- and structural integrity-tested receptacles from the receiving elements and for stacking the removed receptacles comprises for each track a transfer gripper for grasping said receptacles.

9. The apparatus of claim 8, wherein each transfer gripper is arranged to assume a rest position above the track and to be lowered from the rest position to the track for grasping and removing said receptacles from the receiving elements.

10. The apparatus of claim 8, wherein the means controlled by said second testing station for removing the oriented and contour- and structural integrity-tested receptacles from the receiving elements and for stacking the removed receptacles comprises for each track a stacking gripper arranged above the transfer gripper and a holding device for a stack of the receptacles arranged above the stacking gripper, the transfer gripper being arranged to lift a respective one of the removed receptacles within the grasping range of the stacking gripper arranged thereabove, and the stacking gripper being arranged to move the receptacles to the stack of receptacles.

11. The apparatus of claim 10, wherein the conveyor mechanism comprises an essentially horizontally extending removal track and the holding device comprises a level monitor, the holding device being pivotal towards the removal track in response to a predetermined stack level monitored by the level control for depositing the stack of receptacles on the removal track.

12. The apparatus of claim 1, wherein the means for depositing the receptacles in the receiving elements of the conveyor mechanism comprises a feeder device for delivering the receptacles to the receiving elements.

13. The apparatus of claim 12, further comprising a baking oven for baking the receptacles, the baking oven comprising multi-part baking molds for the receptacles which are capable of being opened and closed, the baking molds being linked to each other to form an endless chain revolving in the baking oven in a conveyance plane, and the endless chain of baking molds constituting the feeder device.

14. The apparatus of claim 13, wherein the means for depositing the receptacles in the receiving elements of the conveyor mechanism further comprises a holding device for the receptacles, the holding device being arranged below the conveyance plane and to accompany the revolving baking molds over a predetermined distance of the conveyance path of the baking molds from the time they are opened until they have delivered the receptacles to the holding device, the holding device being movable back and forth between the conveyance path of the baking molds and the conveyor mechanism, and the holding device being arranged to receive the receptacles after the baking molds have been opened and to deliver the receptacles to the receiving elements of the conveyor mechanism.

15. An apparatus for stacking individual, one-piece hollow receptacles open at one end and stackable by being nested inside each other, which comprises
(a) an elongated conveyor mechanism extending in a conveying direction and having receiving elements for the receptacles arranged in one or more tracks extending in the conveying direction, and disposed sequentially along the conveyor mechanism and sequentially passing by the receptacles as the receiving elements are conveyed in said direction by the conveyor mechanism,
(b) an intake station comprising means for depositing the receptacles in the receiving elements of the conveyor mechanism,
(c) a first testing station comprising means for testing the receptacles in the receiving elements for a nominal contour and for removing portions of the receptacles projecting beyond said contour,
(d) a second testing station comprising means for testing the contour-tested receptacles in the receiving elements for structural integrity, and
(e) a stacking station comprising means controlled from said second testing station for removing the contour- and structural integrity-tested receptacles from the receiving elements and for stacking the removed receptacles.

16. The apparatus of claim 15, wherein the means for testing the receptacles in the receiving elements for a nominal contour and for removing portions of the receptacles projecting beyond said nominal contour comprises for each track a calibration mandrel corresponding to an inner nominal contour of the receptacles and insertable in the receptacles, the mandrel removing portions of the receptacles projecting beyond said inner contour upon insertion in the receptacles.

17. The apparatus of claim 15, wherein the means for testing the receptacles in the receiving elements for a nominal contour and for removing portions of the receptacles projecting beyond said nominal contour comprises for each track a stationary punching template corresponding to an exterior nominal contour of the receptacles, the conveyor mechanism being arranged to convey the receptacles in the receiving elements through the stationary template and the template cutting off portions of the receptacles projecting beyond said exterior contour as the receptacles pass through the template.

18. The apparatus of claim 15, wherein the means for testing the receptacles in the receiving elements for a nominal contour and for removing portions of the receptacles projecting beyond said nominal contour comprises a surface processing device for removing said projecting portions.

19. The apparatus of claim 15, wherein the second testing station comprises for each track a measuring head arranged to be sealingly mounted on the open ends of the receptacles conveyed in said track, a source of compressed air, a line connecting the compressed air source to the measuring head and conducting a stream of compressed air from the compressed air source to the measuring head, a restrictor arranged in said line, two air pressure measuring sensors arranged to measure the air pressure prevailing in the line at a respective side of the restrictor, and an analysis unit connected to the measuring sensors, the analysis unit forming the difference between the air pressures at the respective sides of the restrictor and said difference constituting a measurement value for the structural integrity of the receptacles.

20. The apparatus of claim 15, wherein the second testing station comprises for each track a measuring head arranged to be sealingly mounted on the open ends of the receptacles conveyed in said track, a source of suction, a line connecting the suction source to the measuring head and conducting a stream of sucked air from the suction source to the measuring head, a restrictor arranged in said line, two air pressure measuring sensors arranged to measure the air pressure prevailing in the line at a respective side of the restrictor, and an analysis unit connected to the measuring sensors, the analysis unit forming the difference between the air pressures at the respective sides of the restrictor and said difference constituting a measurement value for the structural integrity of the receptacles.

21. The apparatus of claim 15, wherein the means controlled by said second testing station for removing the contour- and structural integrity-tested receptacles from the receiving elements and for stacking the removed receptacles comprises for each track a transfer gripper for grasping said receptacles.

22. The apparatus of claim 21, wherein each transfer gripper is arranged to assume a rest position above the track and to be lowered from the rest position to the track for grasping and removing said receptacles from the receiving elements.

23. The apparatus of claim 21, wherein the means controlled by said second testing station for removing the contour- and structural integrity-tested receptacles from the receiving elements and for stacking the removed receptacles comprises for each track a stacking gripper arranged above the transfer gripper and a holding device for a stack of the receptacles arranged above the stacking gripper, the transfer gripper being arranged to lift a respective one of the removed receptacles within the grasping range of the stacking gripper arranged thereabove, and the stacking gripper being arranged to move the receptacles to the stack of receptacles.

24. The apparatus of claim 23, wherein the conveyor mechanism comprises an essentially horizontally extending removal track and the holding device comprises a level monitor, the holding device being pivotal towards the removal track in response to a predetermined stack level monitored by the level control for depositing the stack of receptacles on the removal track.

25. The apparatus of claim 15, wherein the means for depositing the receptacles in the receiving elements of the conveyor mechanism comprises a feeder device for delivering the receptacles to the receiving elements.

26. The apparatus of claim 25, further comprising a baking oven for baking the receptacles, the baking oven comprising-multi-part baking molds for the receptacles which are capable of being opened and closed, the baking molds being linked to each other to form an endless chain revolving in the baking oven in a conveyance plane, and the endless chain of baking molds constituting the feeder device.

27. The apparatus of claim 26, wherein the means for depositing the receptacles in the receiving elements of the conveyor mechanism further comprises a holding device for the receptacles, the holding device being arranged below the conveyance plane and to accompany the revolving baking molds over a predetermined distance of the conveyance path of the baking molds from the time they are opened until they have delivered the receptacles to the holding device, the holding device being movable back and forth between the conveyance path of the baking molds and the conveyor mechanism, and the holding device being arranged to receive the receptacles after the baking molds have been opened and to deliver the receptacles to the receiving elements of the conveyor mechanism.

* * * * *